(12) United States Patent
Wright et al.

(10) Patent No.: US 6,581,040 B1
(45) Date of Patent: Jun. 17, 2003

(54) PROJECT SPECIFIC COMMUNICATIONS SYSTEM AND METHOD

(76) Inventors: Daniel B. Wright, 235005 Lechelt Rd., Kennewick, WA (US) 99320; Dann J. Flesher, P.O. Box 9, Benton City, WA (US) 99320

( * ) Notice: Subject to any disclaimer, the term of this patent is extended or adjusted under 35 U.S.C. 154(b) by 0 days.

(21) Appl. No.: 09/507,364

(22) Filed: Feb. 18, 2000

(51) Int. Cl.[7] .............................................. G06F 17/60
(52) U.S. Cl. ..................... 705/8; 705/1; 705/7; 705/37
(58) Field of Search ............................. 705/1, 7, 8, 37

(56) References Cited

U.S. PATENT DOCUMENTS

| | | | |
|---|---|---|---|
| 4,797,839 A | * | 1/1989 | Powell |
| 4,885,694 A | | 12/1989 | Pray et al. ............. 364/464.01 |
| 5,132,899 A | | 7/1992 | Fox ............................ 364/408 |
| 5,189,606 A | | 2/1993 | Burns et al. ................ 364/401 |
| 5,208,765 A | * | 5/1993 | Turnbull |
| 5,249,120 A | | 9/1993 | Foley .......................... 364/401 |
| 5,548,506 A | * | 8/1996 | Srinivasan |
| 5,623,404 A | * | 4/1997 | Collins et al. |
| 5,625,827 A | | 4/1997 | Krause et al. .............. 395/763 |
| 5,855,008 A | | 12/1998 | Goldhaber et al. ........... 705/14 |
| 5,893,082 A | | 4/1999 | McCormick ................ 705/400 |
| 5,920,849 A | | 7/1999 | Broughton et al. ......... 705/400 |
| 5,950,206 A | | 9/1999 | Krause ....................... 707/104 |
| 6,047,274 A | * | 4/2000 | Johnson et al. |
| 6,308,164 B1 | * | 10/2001 | Nummelin et al. |
| 2001/0028364 A1 | * | 10/2001 | Fredell et al. |
| 2001/0049654 A1 | * | 12/2001 | Cecchetti et al. |
| 2002/0049660 A1 | * | 4/2002 | Obrador et al. |

FOREIGN PATENT DOCUMENTS

JP 08-328974 * 12/1996

OTHER PUBLICATIONS

Riverside Group, Inc. Expands Its Internet Activities; Partners With Hanley–Wood for Launch of Home Building Resource.com; Aug. 27, 1998; PR Newswire, p827FLTH014.*

* cited by examiner

Primary Examiner—John G. Weiss
Assistant Examiner—Kevin Saunders
(74) Attorney, Agent, or Firm—Robert L. Shaver; Frank J. Dykas; Stephen M. Nipper

(57) ABSTRACT

The present invention relates to systems for providing enhanced communications for the managing of projects, particularly to project communications involving multiple resource providers. The invention provides for a network accessed business system and database. The system permits parallel public, limited, and proprietary access to database information for the purpose of establishing and managing projects requiring multiple, and potentially competitive, resource providers. The invention specifically provides for the exchange of information required between project owners, project managers, and competitive, bidding resource providers necessary to assemble and manage both materiel and an effective project team.

50 Claims, 7 Drawing Sheets

PROJECT SPECIFIC COMMUNICATIONS SYSTEM AND METHOD

BACKGROUND OF THE INVENTION

1. Field of the Invention

The present invention generally relates to systems and methods for providing enhanced communications for the managing of projects, and more particularly to systems and methods for managing and monitoring construction project communications involving multiple resource providers.

2. Background Information

An example of such projects are Construction projects which involve a complicated process requiring the cooperative efforts of multiple business entities, in which work for the projects are posted for bids, bids are placed, bids are evaluated, bids are awarded, and construction takes place. One specific type of construction project is the "specified bid construction" process which has evolved a complicated and cumbersome method for connecting work to be done with entities who are capable and interested in doing such work. This is the bidding system typically related to large construction projects, which are based on a large set of professionally prepared project specifications.

A typical life cycle of such a process follows. Such a project begins when an owner decides to build a building. The project owner could be a government entity, a business, an individual, or a group of individuals. The owner has some conception of the project, or has certain functional specifications which are required. For instance, the owner may require parking to be available for 200 automobiles, or may require the project to be for a 14-story building with a certain number of square feet available on each floor for rent. The owner defines whatever aspects of the project are critical to him, and prepares some general description of the project.

Next, the owner posts the general description of the project, and invites architects, designers, and engineering companies or other qualified individuals to submit proposals for the project. The proposals of these architects, designers, and engineers, or companies with some or all of these abilities, are submitted, and may include proposed plans for the design, appearance, and general specification of the project. From these submitted proposals, the owner selects the firm with the preferred design bid and awards the design contract to that firm. This may be a firm with one architect, one designer, or one engineer, or it can be a huge firm with a large staff of such professionals.

The Architect or Architect/Engineer (A/E) firm which is awarded the design bid is called the "Project Manager" after winning the design bid. The Project Manager next prepares detailed specifications which define the details of the project in much higher detail than the owner's proposal contained. There are typically some 16 defined major divisions of work within a project based on categories of construction defined in a widely accepted "CSI" code. Some projects may have only a few divisions, others may have all 16. (The 16 divisions are also broken down into sub divisions.)

Once these detailed specifications are prepared, they are posted for bid. In the current system, these detailed specifications are made available to potential bidders by announcing their availability through local plan centers or through a pre-selected General Contractor. Interested bidders may contact the Project Manager and seek to be placed on an allowed bidders list. As registered bidders, they can get copies of the written plans, drawings and specifications, or portions of them, and begin reviewing them to prepare individual bids.

Several business entities may prepare competitive bids on one or more portions of the specified work. Bids for completing the work which is outlined in the detailed specification are bid and performed through several layers of contractors. These contractors could be called resource providers, because they provide various resources which are needed by the project. These resources could be labor, equipment, materials, or management. The prior art system of managing the bidding and information flow of a project is shown in FIGS. 1 and 2.

The zero level of bidding occurs as above, when the Architects compete for the project design work. The second and more extensive level of bidding starts when general contractors bid on the right to manage the overall project. At this step of the process, general contractors evaluate the overall project, and begin preparing overall bids. In order for a general contractor to prepare a complete project bid, the general contractor requests bids from contractors for specific divisions or sets of divisions of the project. This information is needed so that the general contractor can get a good estimate of what it will cost for him to do the project. In order for contractors to submit bids to the general contractors, they in turn request bids from subcontractors on individual divisions or portions thereof. Before the subcontractors can submit bids to the contractors, the subcontractors must invite bids from vendors. So, in order for each general contractor to prepare a bid for the project, he must have a chain of bids from contractors, subcontractors, and vendors. When this is accomplished, each general contractor who is interested in the project compiles and submits their bid for completing the entire project. One particular vendor may submit bids which are included in the bids of a number of different subcontractors, contractors, and general contractors. Likewise, subcontractors and contractors may submit a number of bids to work with various general contractors.

For a chance at the successful completion of the project, the winning bidder must assemble a large and complex partnership, linked by bids and proposals based on the design and specifications published for that project. Each project publication initiates a new series of communications, bids and partnerships. While several such temporary partnership structures may form for each posted project, only one is successful. The efforts of "losing" bidders are lost, and the costs of that effort must be absorbed by the business entities involved.

After the general contractors have submitted bids for the project, the owner or the architect, or the two in combination, select a general contractor to manage and complete the project. In order for the general contractor to complete the project, each contractor, subcontractor, and vendor of supplies, material or equipment, performs the portion of the work which they agreed to, in the schedule they agreed to in their bids to the general contractor, and eventually the project is completed.

This general flow of information, offers, bids, and commitments, which is illustrated in FIG. 1 would appear to be fairly simple and effective. However, in practice, there are many problems with this system. FIG. 2 shows a more detailed view of some of the interactions that take place between some of the larger steps which are shown in FIG. 1. For instance, when the detailed specifications of a project are posted for bids, and as contractors, subcontractors, and vendors evaluate the postings, they set into motion the task of screening a variety of simultaneous postings, seeking additional details on postings of interest, proportioning projects between themselves, and seeking partnerships among themselves to be able to bid on portions of the project for which they are qualified. The contractors, subcontractors, and vendors also make bid decisions, form a variety of temporary partnerships, and prepare bids. All of these interactions require extensive communications between each entity. These activities are disorganized and involve delay, expense, and frustration for the contractors, subcontractors, and vendors. Eventually, however, the vendors submit bids for the project to subcontractors, who submit their bids to contractors, who submit their bids to the general contractors, who submit their bids to the Project Manager or owner.

The inefficiencies and bottlenecks in communication and allocation of resources inherent in this system are best addressed by a network-based communications system to facilitate every step of the process. Such a system would add value from the point at which the site owner begins seeking design assistance, through the design, bidding and construction, down to the day of occupancy of the new facility, where the owner turns over the key to the new residents of the building.

Accordingly, it is an object of the invention to provide a system and method for managing communications between resource providers and project owners in a network-based business system. Another object of the invention is to provide a system in which information about work to be performed is clearly and professionally communicated to potential resource providers who may be interested in performing the work. Another object is to provide a means of statusing the state of completion of bids on a project phase. A further object is to provide a means for reporting errors or omissions in the projects specifications at each phase of the specification process. It is also a desirable objective to provide a means for suggesting changes to the design that may be significant to the bid estimates on any portion of the project. Another object of the invention is to accomplish the above objectives without violating the proprietary rights of any participating business entity and without jeopardizing the highly competitive nature of the overall process.

It is a further object of the invention to provide a means of statusing the design and responding to questions, comments, or suggestions submitted by the participants. Such design changes may be added in the form of addenda and may include changes in design specifications, plan text errors, drawing errors or omissions. Such addenda may also be legal and ethical requirements placed upon the project management.

It is also an object of the invention to provide a means for resource providers to post a current level of interest in a specific project in order to locate complementary resource providers who wish to form a partnership or partnerships to perform work on a project or on a specific portion of a project.

Another object of the invention is to provide a means of identifying the interests, qualifications, and capability of resource providers such as architects, designer, engineers, general contractors, contractors, subcontractors, and vendors, so that the resource providers might may be notified of projects of possible interest in the future, and so that persons interested in the resources they can provide can find, locate, and communicate with them easily.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

It will also become apparent to those skilled in the art upon such examination that the objects, advantages and novel features of the invention may be applied to the management and communications requirements of other projects, project owners, and resource providers not necessarily related to the field of construction.

SUMMARY OF THE INVENTION

These and other objects are accomplished in the invention, which is a method and system for managing communications between resource providers and project owners. The method and system is a network-based business system which includes a number of steps.

Project owners and a number of resource providers are connected to a network-based database. Project owners can include government agencies, corporations, individuals, groups of individuals, or any entity which desires to complete a project of some kind. The example provided is for construction projects. This would typically be for a building, but could be for any type of construction project, such as a highway project, parking lot, sidewalks, tunneling projects, mass transit projects, or even projects which are primarily services, such as street sweeping, municipal sanitation, municipal transportation, freight transportation, or other such services.

The project owners and resource providers are linked through the network to the resource system database. Each participant is both a provider of data to the database and a user of the database. The database exists as one or more databases accessed through a network, and the databases may reside on a number of computers. The system database is administered by a system manager or administrator.

The project owner prepares a set of specifications which define his proposed project, and posts these specifications on the resource system database, which is accessible from the network.

The resource providers provide a set of criteria for the database which defines the range of characteristics of projects of interest to them, and provides a set of their qualifications to perform all or a portion of such projects.

A means is provided for the resource providers to review and select the projects which are of interest to that particular resource provider. That means may include the automatic matching of the specifications of each project with the resource provider's criteria to effect the screening or filtering of projects to aid in the selection process.

After selecting and reviewing the details of a project of interest, a resource provider can bid on this project or a portion of the project. After receiving bids from resource providers, the project owner can evaluate the bids, confirm the qualifications of the bidders, and select a winning bidder for the project or a portion of the project.

The description above is a general description of a generalized project, and how the system and method of the invention manages those communications, and makes information available to the parties. The step of preparing the specification might also include further steps of announcing a project, publishing its scope, and requesting proposals from design professionals such as architects, engineers, or designers.

These design professionals would aid in the development of detailed specifications, such as project plans, designs, drawings, and blueprints. The resource providers involved could operate at a number of levels. The various levels of resource providers would include the design professionals (zero level), who are architects, designers, and engineers, and companies which provide those services. Another level of resource provider would be the general contractors (first level). Other levels of resource providers could be contractors, subcontractors, and vendors. The system or method of the invention would provide a means for a first level resource provider to divide a project into portions and post one or more of these portions for bidding by one or more second level resource providers. Thus a general contractor could divide the project into portions and post its selected portions for bid by contractors.

The system and method of the invention also provides a means by which project owners can report changes to project specifications, and make those changes available to system users. This could be in the form of corrections of errors, changed drawings, or clarification of terms. This posting helps fulfill the owners ethical and legal obligations to report any material changes to all parties involved in the process. This feature also eliminates a major problem with the prior art system, by making such changes, modifications, and corrections to the specifications readily available to the system users.

One way for resource providers to select projects which interest them is to set up a separate file or database of resource provider capabilities. This database would contain information relating to the capabilities of resource providers, which the resource provider would enter in a template. The database could filter the available projects and match them with the capabilities of resource providers, and yield a list of projects which fall within the resource capabilities of an interested resource provider. This selection capability could also work in the other direction, and allow the project owners to arrive at a list of resource providers who are likely to have the capabilities and interest in the project. The same feature would be available at all levels of the chain, for resource providers to find work in which they are interested, and for owners or higher level resource providers to find resource providers who can provide specific resources for their projects.

Each participant in the system would typically submit a set of information to the database of the system or method, and this set of selection information will be termed a "template." For instance, the owner of the project would submit general project specifications in a project specification template as part of the step of preparing the specifications for the project. Preparing the specifications of the project could also be done by the owner, in conjunction with a design professional such as an architect, engineer, or designer, and this more detailed information could also be submitted in a detailed project specification template.

In addition to the zero or design level, other resource providers at a variety of levels could be linked to the network. These could be termed first level, second level, third level resource providers, and there could be a number of other levels. The design professional could be a zero level resource provider, the general contractor could be first level resource provider, the contractor could be a second level resource provider, subcontractors could be a third level resource provider, and vendors could be the fourth level resource provider. Vendors could be companies that supply tools, equipment, material, services, or other items used by resource providers. Vendors could include manufacturers, manufacturer's representatives, supply houses, distributors, companies, or any supplier of such items.

The system or method also provides a means for the various levels of resource providers to form temporary associations or partnerships in order to bid on and complete a portion of the project. Resource providers at all levels enter information concerning their interests in various types of projects, and capabilities of performing certain types of projects. Projects which fall within their specified criteria of interest, are selected (or screened) by the system from all of the projects in the database, and the interested resource provider is notified of such projects. Background information of each resource provider is also entered into the database so that the resource providers can be selected to meet the qualifications required by the specifications of the project.

To facilitate the selection of projects by resource providers, the templates are provided to the resource providers which may be modified by the resource provider to select a new set of projects. These user modifiable templates may remain proprietary or they may be available for viewing by other system users. Multiple user modifiable templates can also be supplied to resource providers for advanced filtering of the system databases. Thus a resource provider may consider a group of projects within a narrow geographic range by setting that narrow range on the template. If the provider is not satisfied with the number of projects, the template may be modified to cover a wider geographic area to generate and notify the provider of a larger number of otherwise acceptable projects.

A means is also provided for system participants to communicate with other system participants who may require goods or services in order to complete or bid on a portion of a project. This facilitates the formation of temporary partnerships and alliances for completing a bid or for conducting and completing a joint set of work on a project or portion of a project.

A means is also provided for statusing the state of completion of a bid on a project or a portion of a project being prepared by resource providers. Bid date information may also be provided. As part of the statusing of the state of completion of a bid, a list of qualified resource providers may be provided to the parties posting work out for bid. A list of known bidders for a portion of a project may also be made available to system participants. Likewise, a notice to potential bidders of a lack of competitive bids for one or more portions of a project may also be provided to system participants.

Still other objects and advantages of the present invention will become readily apparent to those skilled in this art from the following detailed description wherein is shown and described only the preferred embodiment of the invention, simply by way of illustration of the best mode contemplated by carrying out the invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
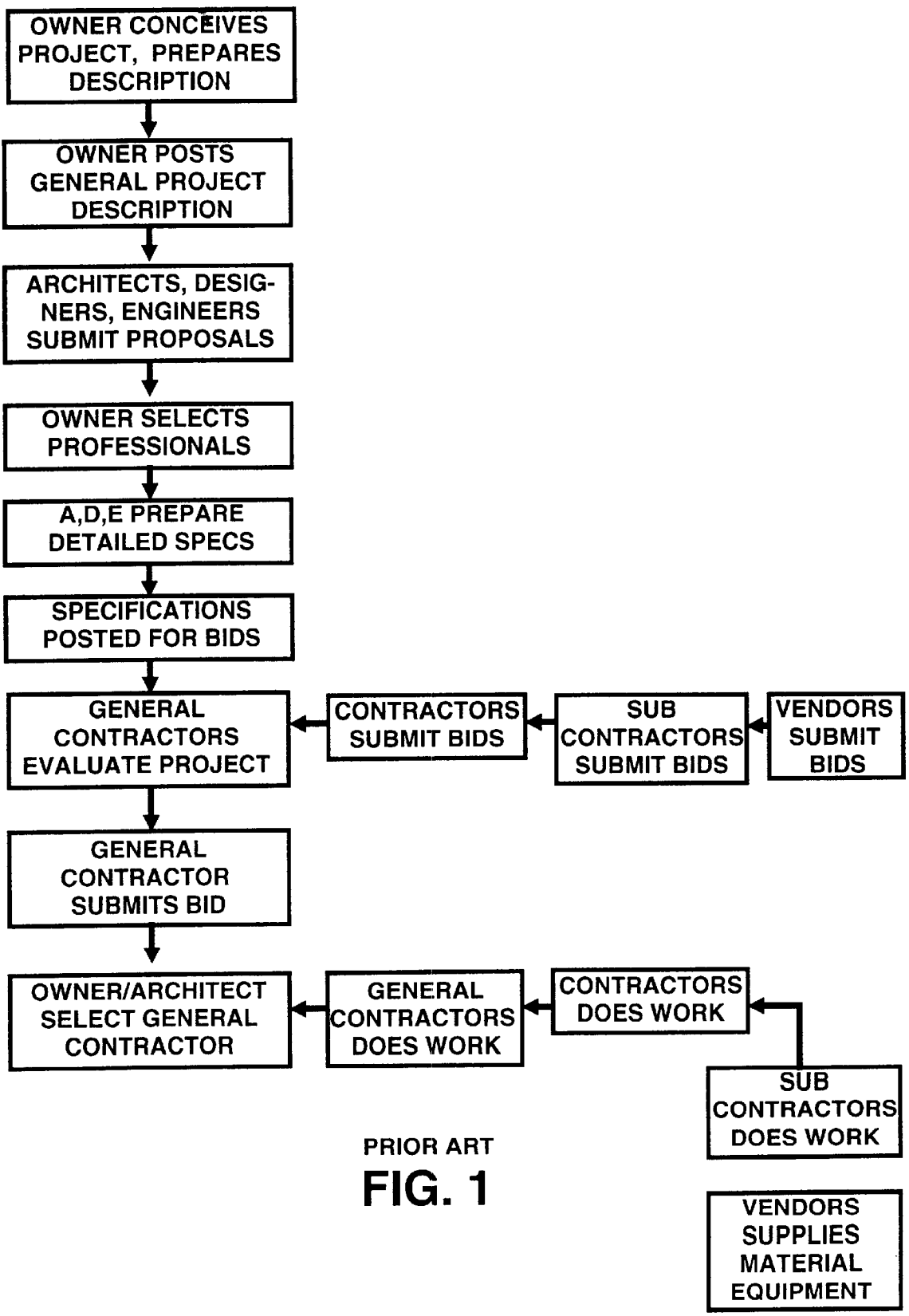
FIG. 1 is a logic diagram of the prior art method.

While the invention is susceptible of various modifications and alternative descriptions, certain illustrated embodiments thereof have been shown in the drawings and will be described below in detail. It should be understood, however, that there is no intention to limit the invention to the specific form disclosed, but, on the contrary, the invention is meant to cover all modifications, alternative constructions, and equivalents falling within the spirit and scope of the invention as defined in the claims.

The invention is a method and system for managing communications between entities, including but not limited to participants such as resource providers and project owners. The typical application of this system and method would be in a construction project. The method and system is a dynamic network-based business system including a database repository for information provided by the participants, a system-internal sorting and matching function, and a filtered or screened data release or notification system.

A system participant provides a set of criteria with three or more strata of data. The first strata is considered public and is accessible by all other entities, both other participants and casual non-participant "visitors" who access the system. A second strata is considered non-public and is used by the participant in categorizing the type of information to be requested from the data base: this strata may be accessible in whole or in part by other participants. A third strata is data that is considered by the participant to be proprietary, and is not available to the public or to other participants.

Submittal of the first strata of data can also be considered as a method of making public and publishing the capabilities and desires of the participant. The second strata is used as a dynamic screening device to select specific types of data from the database for consideration by the participant. The third strata of data is information considered proprietary to the participant and is used solely by the participant to further screen and classify the data requested from the database.

The set of data submitted by a participant is "owned" by the participant. Access to the system is provided for the participant to post the data to the database, to inactivate the data or withdraw the data from the database, or to modify the data within the set. Other participants may "read" or use the data for screening or classification purposes, but they may not modify the data.

The database is thus described as a dynamic database. It is constantly being updated by the participants. The stored data thus remains timely and of current value to all participants and to the public visitor. Incoming project data is compared with resource provider data, is screened, and notices or alerts are distributed to participants based on current needs and interests.

The data in the database is available to the participants, but is too extensive for casual reading or manual screening. The template submitted by each participant acts as a filter to limit the data to scope and interests specific to that participant.

Each template is easily modified by its owner participant to manage the data received. Such modification may be used to further restrict the data, or to expand the data, or to select an entirely different set of data for detailed manual review.

Figure 2:
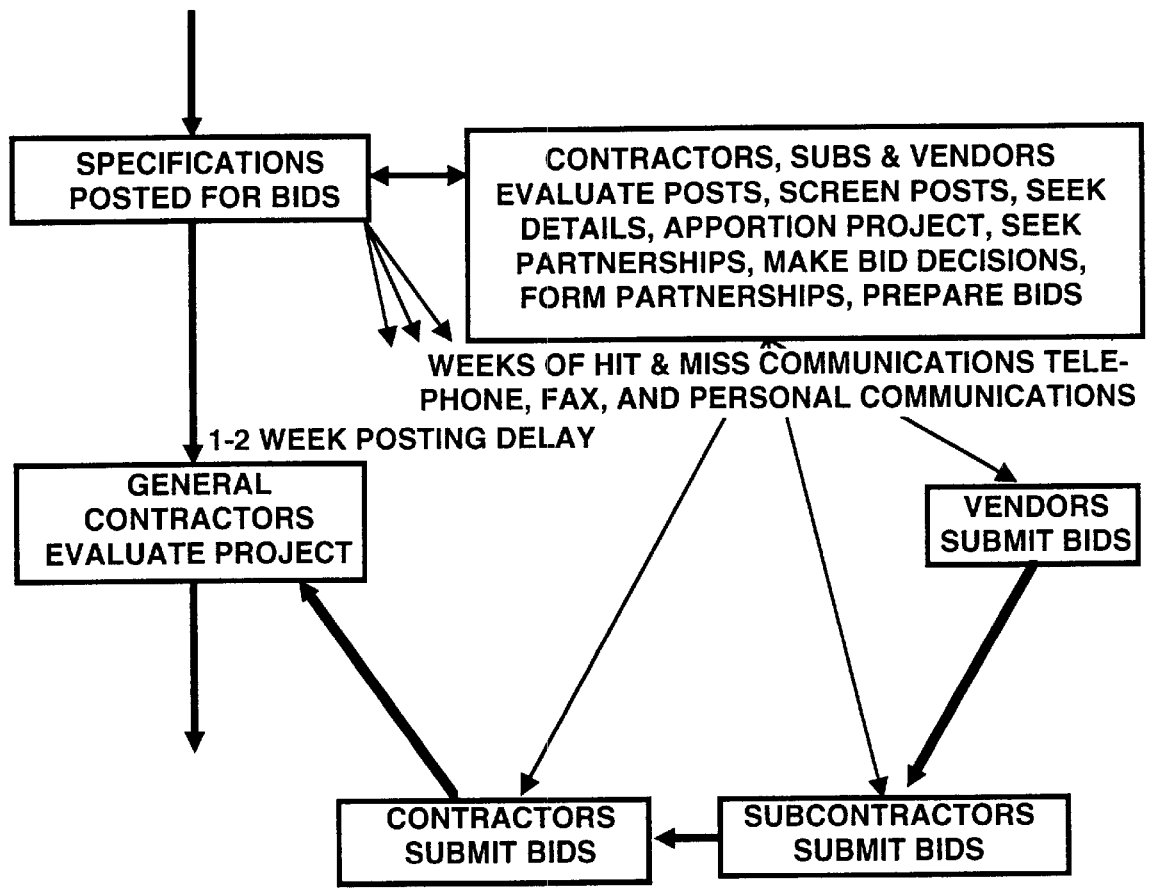
FIG. 2 is a further detail of the prior art method.

As noted previously, the general flow of the prior art bidding and communication pattern is shown in FIGS. 1 and 2. FIGS. 3 through 7 show the method and system of the invention, including the preferred embodiment.

Figure 3:
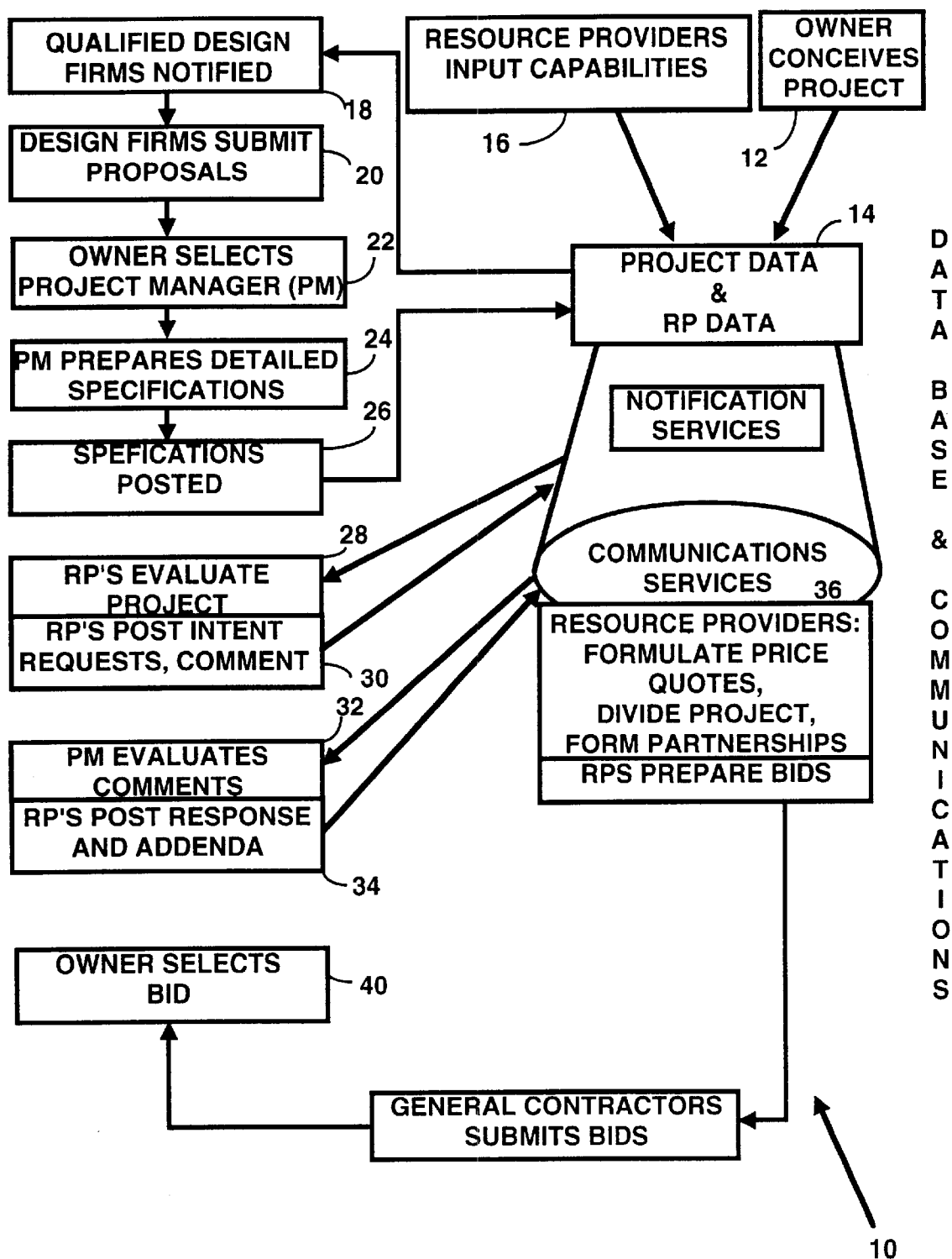
FIG. 3 is a generalized logic diagram of the method and system of the invention.

The general logic flow of the invention, on the same scale as the prior art logic flow of FIG. 1, is shown in FIG. 3. The system or method of the invention is designated as No. 10, and begins at Step 12, when the owner conceives of a project. As noted previously, a project owner can be a government body, a corporation, a utility, a municipality, an individual, combinations of individuals, or any entity which undertakes to complete a project. Projects may involve construction, manufacture, a service-related project, or other activities requiring the cooperative effort of an assemblage of resource providers. After conceiving of the project at 12, the owner enters his specification for the project in the system database at 14. Once these specifications are in the system database at 14, it is available for selection and review by the resource providers.

As shown in FIG. 3, the initial resource providers who will look at the system specifications as they exist at this stage are professionals who propose to provide project design and management. For the construction process they are typically design professionals such as architects, designers, and engineers, or firms that perform these services. These resource providers are shown as "design firms" or "design professionals" in the figures.

To begin participating in the preferred embodiment of the system, the design professionals would submit at least one and preferably two templates which contain information about the design firm's capabilities, and the general characteristics of projects in which they are interested.

One template would be a template which is made public in the database system, and would list the firm's capabilities, assets, past accomplishments, key personnel, and other information which project owners would be interested in reviewing. The design professionals would also fill out a second template which would remain confidential. This template would serve as a filter for selecting which of the possible projects meet the specific or immediate requirements of the design firm. In this second template, the design firm might indicate that it wanted listings of projects which fell within certain geographic regions, within a certain floor plan size, which started at certain times, which were or were not funded by a government agency, or other criteria which might be important to the design firm.

After this information had been filled out in the form of these templates at block 16, information about all of the proposed projects in or added to the database would be matched against the template criteria using a screening or filtering means within the system. Thus, only prescreened or filtered projects would be made immediately available to the design resource providers, at block 18. (Note that a different set of projects or even ALL projects can be made available to the user at their volition by modifying their own template or by removing the template limitations completely.)

FIG. 3 shows the resource providers inputting their capabilities and interests at Block 16 and being notified of projects of interest at Block 18. This figure also shows that the term resource provider applies to all members of a resource hierarchy which can include general contractors, contractors, subcontractors, and vendors of materials, equipment, personnel and service, as well as design firms. The design firm enters the system to offer and provide services directly to the project owner. The successful (bid winning) design team becomes the project manager. Others enter the system to offer and provide services to the project manager, or to offer or provide services to others in various levels of the hierarchy. Thus while the participants within the system may be relatively permanent, with each project, a new hierarchy of those participants forms to meet the requirements of the project.

At Block 20, the resource provider (design team) selects from the projects of interest and submits proposals for preparing detailed specifications and designs for the project. From among the proposals submitted by the design firms, the owner selects, at Block 22, a project manager or project designer. After the owner selects the project manager, the selected project manager prepares detailed specifications of the project at Block 24. At Block 26, these specifications are posted back into the system database 14, being added to the previously posted data.

Once posted, these project details are available for matching with the other resource provider templates resulting in screening and selection according to resource providers capabilities, ratings, and preferences. As the system screening is performed, information about the detailed specifications are sent out to the qualified resource providers at Block 28.

After receiving notices of qualifying projects, reviewing, and selecting a project, the qualified resource providers post to the system database at Block 30 their intent to bid. They may also post any questions or comments which they may have about the specifications of the project, and such posts are forwarded to the project manager. Questions clarifying the needs of the project may be of general interest, and may result in the project manager posting changes in the specification, or attaching addenda to the specification at Block 32 and 34. These addenda are immediately routed to all of the qualified resource providers who have posted an intent to bid.

Using the communication services at Block 36, the resource providers can request bids from other resource providers on specific divisions or on portions of divisions of the project, and they can also use this communication tool to seek out other resource providers who can compliment their capabilities for a specific project and bid on selected portions of the posted jobs.

From the communications service Block 36 of the system database 14, resource providers can formulate price quotes for one or more project divisions based on price quotes they have received for portions of those divisions, they can further subdivide the project and bid parts of it while putting out other parts of it for other bids, and they can form partnerships and alliances with other resource providers to combine quotations on these parts into a single bid.

The final result from the communication services at Block 36 is that the resource providers can prepare bids and submit them to the next higher level resource provider. The vendors will make bids to the third level resource provider, who submit bids to the second level resource provider, who will submit bids to the first level resource provider, who will submit bids to the project manager at block 38, who submits bids and recommendations at Block 40 to the owner. A first level resource provider, typically a general contractor, thus assembles and proposes a structure or hierarchy of resource providers and materiel required to complete the project. Competitive first level resource providers, or general contractors propose alternative hierarchies as an integral part of their bid package. The owner, possibly in combination with the project manager or design team, will select the preferred general contractor at Block 40

Figure 4:
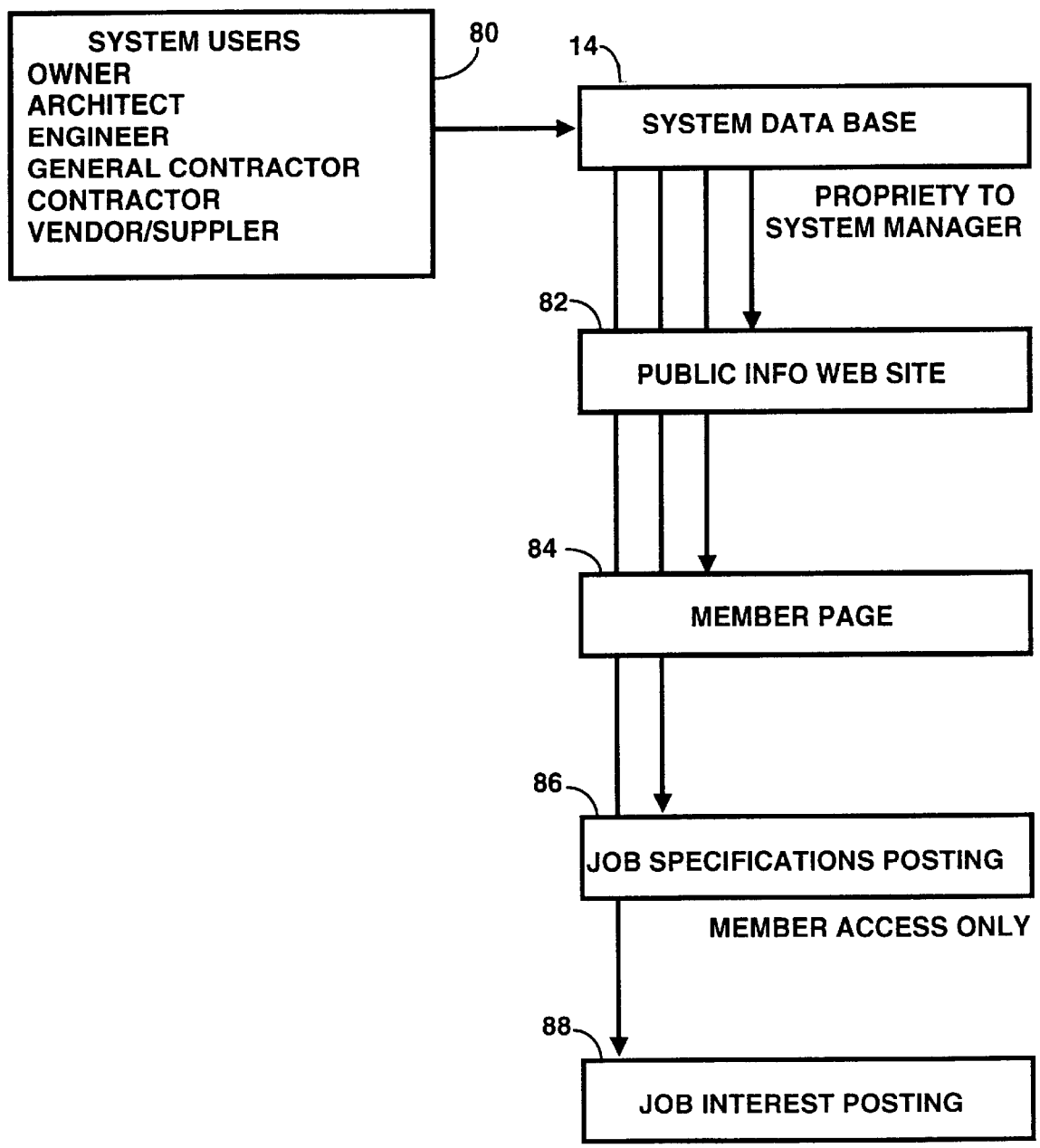
FIG. 4 shows the collection of data from system users, and its distribution in the system.

FIG. 4 shows another aspect of the system or method of the invention. FIG. 4 shows the information which is collected from users of the system and which is made available to other users. At Block 80, system users are listed. These include project owners, architects, designers, engineers, general contractors, contractors, subcontractors, and vendors and suppliers. Each of these system users submits information to the system database 14. From the information which is submitted by each of the system users, the complete database is not available to every user, but is kept proprietary to the system manager. A public information web site 82 is also available which posts certain public information from the system database 14, and makes it available to all system users. Other information from the system database 14 is posted to a member web page 84, which is accessible only to registered system users. Other information from a system database 14 is posted to a job specification posting 86, which is made accessible only to certain users. Users would be allowed access based on their being able to meet the requirements of the job specification. Based on a review of the job specifications posting, those system users which were qualified to view and bid on a job could post a notice off interest in a job interest posting at 88.

As presently conceived, the system database 14 would be completely available for internal use by the system manager only. This database would contain all information which is supplied by system users such as geographic service area preferences, history of past jobs, capabilities of various resource providers, project specifications and detailed specifications, bid statuses, and interest postings. The web site 82 would contain postings by system users which include job categories, geographic location, service area, and other types of descriptors. These postings would be from project owners and potential owners who are interested in making "local" contact for specific services. A link would be provided to "contractor yellow pages."

As part of participation in the system or method of the invention, system users would be supplied a basic participant web page 84 with links to other system or non-system web pages. The basic web page would provide information available to internet users on the resource provider's capabilities, preferences, interests, or whatever the member wished to convey. A deluxe web page is also envisioned which provides an internet user with further system user capabilities and with additional detail. Links would be provided between the web pages and the system web page.

The job specifications posting 86 is a set of information which is extracted from the system database 14 and which relates to the specification for projects. These include the location of projects, the schedule, and the section specifications. This set of information would be available only to system users who were qualified for particular projects.

Figure 5:
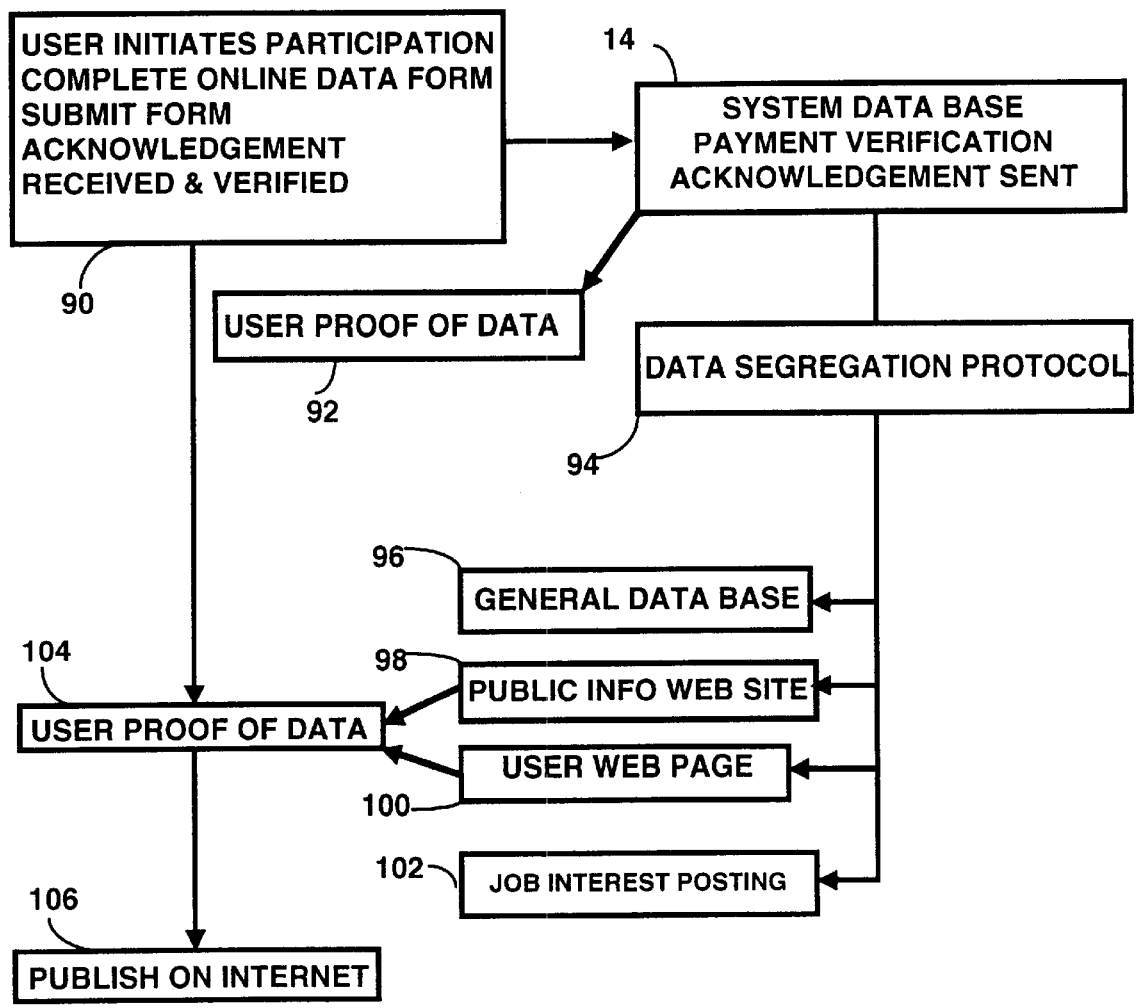
FIG. 5 shows a view of another part of the cycle of information flow.
Figure 6:
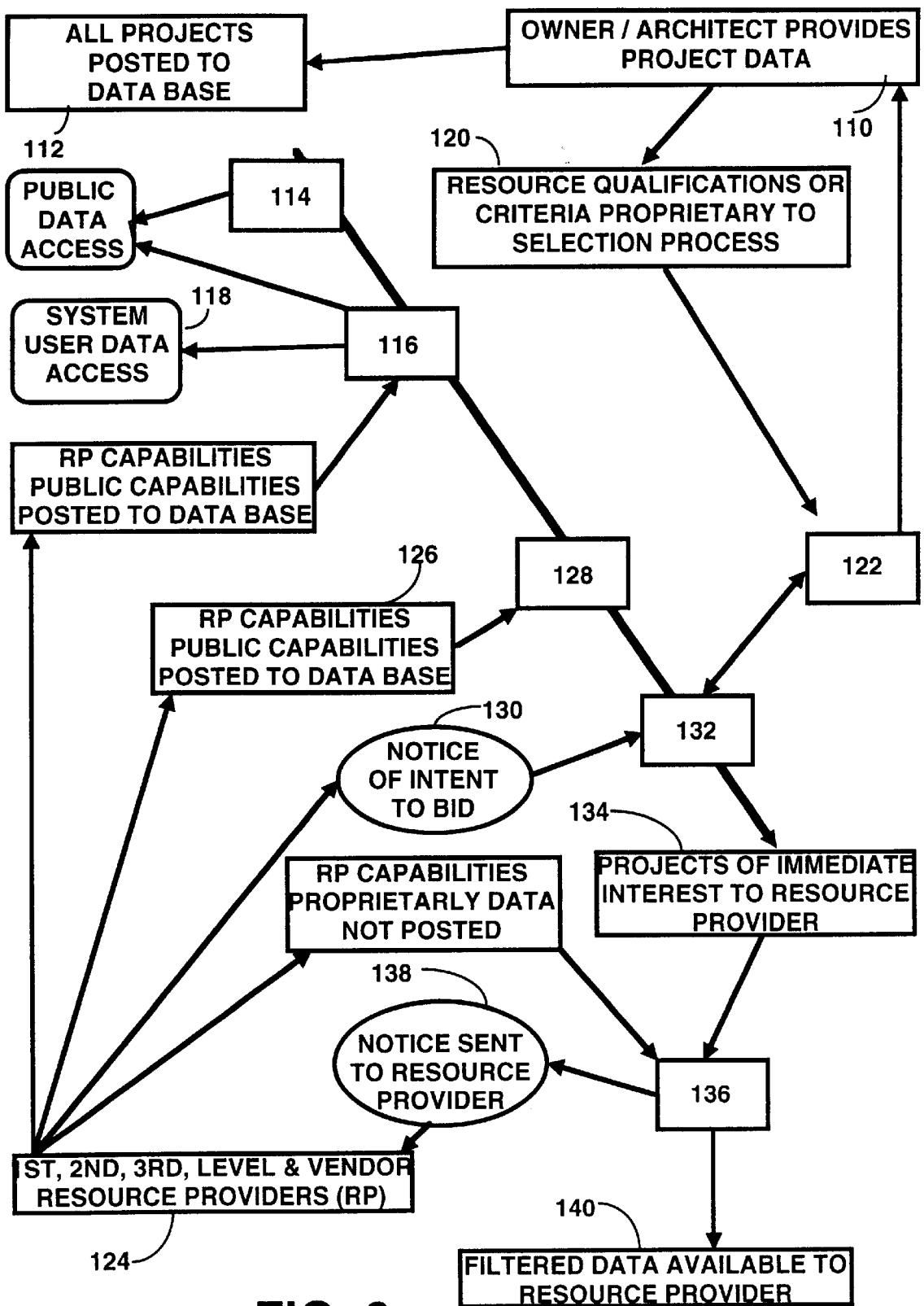
FIG. 6 is a logic diagram showing the use of multiple templates for two way filtering of information.

FIG. 5 shows the cycle of a system user initiating participation in the system or method of the invention. At Block 90, the system user completes an online data form, submits the form, and an acknowledgment is received and verified. The online data form is sent to the system database 14. Payment is verified, and an acknowledgment is sent to the new user. At Block 92, the user data is optionally sent to the new user for review for accuracy. This proof cycle is optional. Once the data of a new user is entered in system database 14, the information is routed through a data segregation protocol at 94. The data segregation protocol at 94 breaks the data into information which is posted to the general database at 96, information which is postable to the publicly accessible portion of the web site at 98, information which is posted to a web page set up for the individual user's benefit at 100, and information which is posted to a job interest posting portion of the database at 102. The information on the publicly accessible portion of the web site at 98 and the user web page at 100 is routed to the system user so that he can proof the data at 104. After the user proofs the data for accuracy, it is published to internet accessible locations at 106.

FIG. 8 shows how the system allows the use of multiple templates for filtering data which is selectively delivered for access to system users. At Block 110, the owner, typically in cooperation with the design professionals such as an architect or engineer, provides project data to the system database 112. This diagram assumes that the selection of a project manager has been made, and detailed specifications have been prepared. A first template at 114 selects information from the database for posting to an internet web site 115, for access by the general public. This information would typically be a brief description of the project in general terms. A second template at 116 would separate out further information and post it to a portion of a web page which is accessible by users of the system.

At the starting point at 110, the owner/architect may also enter in qualifications or criteria which are not publicly posted, but which are recorded and stored in the database at 120. These criteria could specify a preference for minority bidders, a preference for bidders of a certain size, they could bar certain bidders from consideration, or could contain other criteria deemed important by the owner/architect. These specified criteria would go to template 122 for later use by the system. At Block 124, resource providers of all levels and vendors would input information in various ways, and for review by various users. Although first, second and third level resource providers are listed, as well as vendors, the invention also is applicable to systems with more or fewer levels of resource providers. From Block 124, resource provider information is entered at 126, and posted to template 116. Information selected by criteria from this template is routed to the public data access web site 115, and Block 118, where system users can access the selected information via the internet. This information would include capabilities that the resource provider would like to be publicly known. This could be information about the accomplishments of the company, the type of work they perform, past projects which have been completed, and recommendations from past projects. From Block 124, the resource providers and vendors would also post certain information such as capabilities which would remain proprietary and not visible to the public. These are shown at Block 126, and are posted to template 128. Resource providers at 124 also prepare a notice of intent to bid at Block 130, by either offline or online communication. In the preferred embodiment, the resource providers prepare their bids offline and submit their bids offline. However, other embodiments of the invention could include some form of online bid preparation and an online bid submission procedure. The notice of intent to bid at 130 is posted to a template at 132. Potential bidders from 132 are screened by template 122, and certain bidders may be eliminated by the confidential criteria of the project owner. From the original data stream available, the selected data concerning qualifying projects would be routed to block 134, and notice sent to the qualifying resource providers at 138. The resource providers at 124 enter information of a proprietary nature at 125, which is sent to template 136. Proprietary template 136 further selects projects of interests, and at 140 makes the final filtered data available to resource providers.

Figure 7:
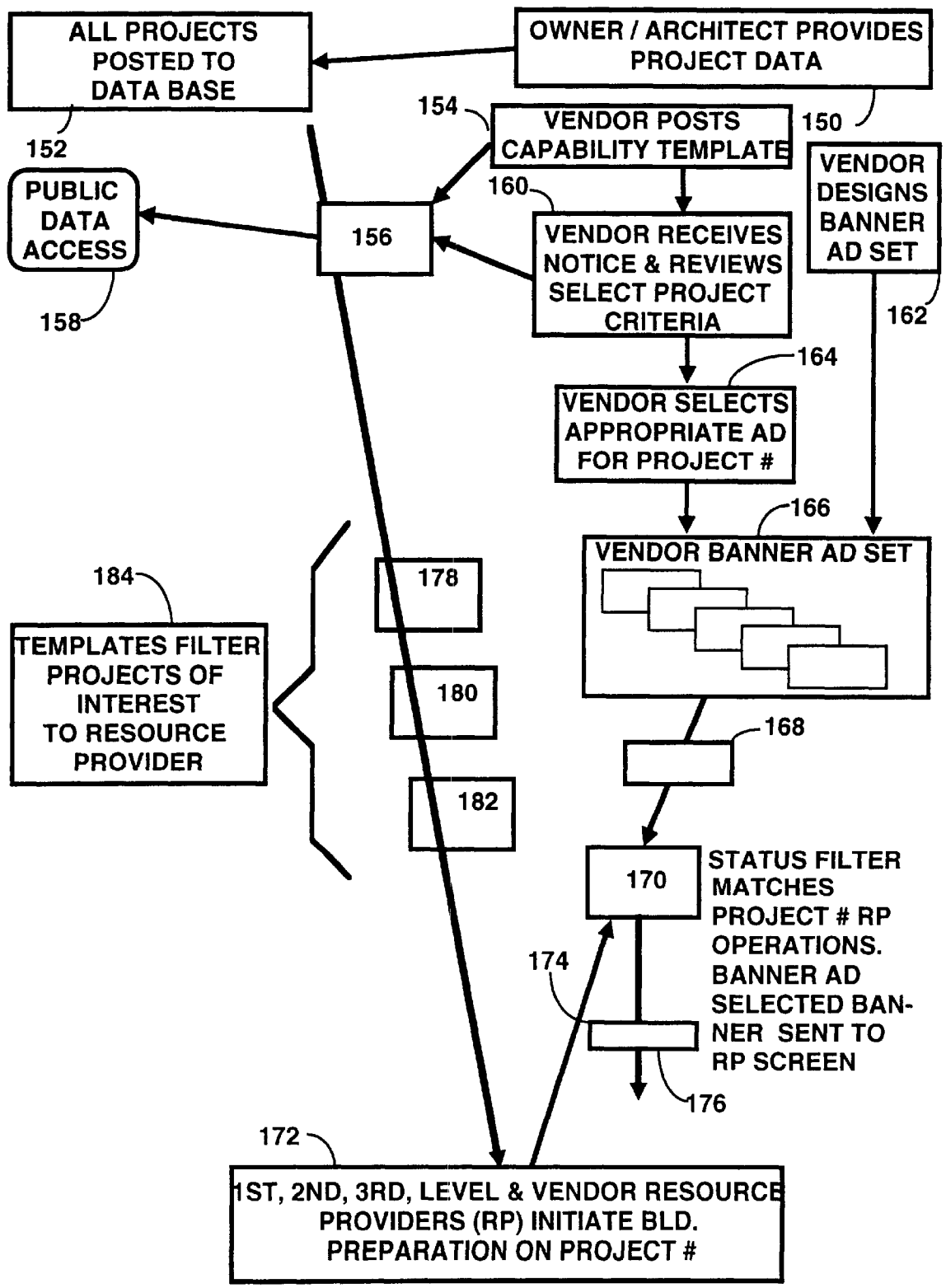
FIG. 7 is a logic diagram showing the interactions of vendors with the system.

FIG. 7 shows interactions between a vendor and the system and method of the invention. A vendor would typically be a person who is selling equipment, goods, or material to one or more of the resource providers. These goods or materials could be plumbing fixtures, flooring materials, wood, steel, concrete, rebar, or any number of other materials that are needed by the resource providers. At Block 150 of FIG. 7, the owner/architect provides project data which is posted to the database at 152. This diagram assumes that the selection of a design team to act as project manager has already taken place. At 154, vendors post information about their capabilities in template 156. That template includes information about the vendors capabilities such as the size of projects he is able to undertake, the type of supplies or materials he can supply, information about past jobs and references, and similar information which would help him secure a contract with the resource provider. Certain of this information is routed to the public data access area of the web page at 158. This would be information which the vendor would like to have available to the public. Template 156 filters information about projects from Block 152, and routes notices of qualifying projects to the vendor, at Block 160. At Block 162, the vendor prepares a set of banner ads for future use to different types of resource providers. He might prepare one or more banner ads for each type of material or equipment which he has to sell, and would later send them to the appropriate resource provider. At Block 164, the vendor selects the appropriate ad for the project under consideration. At Block 166, the vendor selects from the banner ads available, and sends the appropriate ad for the particular resource provider or project. The selected ad is shown at 168, and at 170 is associated with the selected project number. When the resource provider at Block 172 expresses an interest in bidding on a particular project, a signal is sent at 174 to Block 170 which has banner ads from all vendors who are associated with the selected project, and the vendors' ads are routed to the interested resource provider at 176. Templates 178, 180, and 182 are multiple templates which have been put in place as explained further in FIG. 6, and filter projects of interest to the resource provider from among those available on the database at 184.

While there is shown and described the present preferred embodiment of the invention, it is to be distinctly understood that this invention is not limited thereto but may be variously embodied to practice within the scope of the following claims.

We claim:

1. A method for managing communications between resource providers and project owners, in a network based business system, comprising the steps of:

linking one or more project owners to a network;

linking a plurality of resource providers to a network;

linking one or more resource system databases with said project owners and said resource providers, on said network;

preparing specifications of a project by an owner of said project;

posting said specifications on said resource system database accessible from said network;

providing a means for a resource provider to select projects of interest;

providing a means for a resource provider to view specifications of a project of interest to said resource provider;

providing a means for a resource provider to assemble and submit bids on said project of interest, or a portion of said project of interest; and allowing said project owner to evaluate and select a winning bidder for said project or project portion.

2. The method of managing communications of claim 1 in which the step of preparing said specifications further includes the steps of announcing a project, publishing its scope, and requesting proposals from architects, engineers, or designers for the development of detailed specifications, namely project plans, designs, and drawings.

3. The method of managing communications of claim 1 in which the step of linking resource providers further includes the step of linking first level resource providers and second level resource providers to said network.

4. The method of managing communications of claim 3 which further comprises the step of providing a means for said first level resource provider to divide a project into portions and post one or more of said portions for bidding by one or more second level resource providers.

5. The method of managing communications of claim 1 which further comprises the step of providing a means for resource providers to report plan errors or suggest plan changes and for project owners to report the adoption of and publication of changes to the project specifications, and to make said changes available to system users.

6. The method of managing communications of claim 1 in which the step of providing a means for a resource provider to select projects of interest further comprises the steps of entering resource capabilities of a resource provider in a resource provider template, and integrating said resource capabilities with resource requirements of one or more projects, and yielding a list of projects which fall within said resource capabilities of said resource provider.

7. The method of managing communications of claim 1 in which the step of preparing specifications of a project by an owner of said project further includes preparing specifications of a project by an owner and an architect in a project specification template.

8. The method of managing communications of claim 7 in which the step of preparing specifications of a project by an owner and an architect further includes step of preparing specifications of a project by an owner, an architect, a designer, and an engineer, in a project specification template.

9. The method of managing communications of claim 7 which further includes the step of entering background information of the architects, designers and engineers, and making said architect, designer, or engineer background information available to system participants or non-participants.

10. The method of managing communications of claim 1 in which the step of posting said specifications on said network further includes posting project requirements.

11. The method of managing communications of claim 1 which further comprises the step of dividing the project specifications into discreet portions so that each portion can be viewed and bid separately by resource providers.

12. The method of managing communications of claim 1 in which the step of linking resource providers further includes the step of linking zero level resource providers, first level resource providers, second level resource providers, and third level resource providers to said network, in which said first level resource providers provide resources to said project owner or zero level resource providers, said second level resource providers provide resources to said first level resource providers, and said third level resource providers provide resources to said second level resource providers.

13. The method of managing communications of claim 12 which further comprises the step of providing a means for said zero level resource provider to divide a project into portions and post one or more of said portions for bidding by one or more first level resource providers, and first level resource providers to divide a project into portions and post one or more of said portions for bidding by one or more second level resource providers, and providing a means for said second level resource providers to divide a project into portions and post one or more of said portions for bidding by one or more third level resource providers.

14. The method of managing communications of claim 13 which further comprises the step of providing a means of first, second, or third level resource providers to form a partnership for a project and to jointly bid on said project or portion of a project.

15. The method of managing communications of claim 1 which further comprises the step of entering background information on resource providers in a resource provider template relating to their ability to provide resources, and sending said resource provider template to said system databases.

16. The method of managing communications of claim 15 which further comprises making said resource provider background information available to non-system participants.

17. The method of managing communications of claim 15 which further comprises the step of evaluating said background information of resource providers by said project owners as part of evaluating a bid by said resource providers.

18. The method of managing communications of claim 13 which further comprises the step of providing quotes from vendors to first level, second level, and third level resource providers in response to requests for bids on resources.

19. The method of managing communications of claim 15 which further comprises the steps of entering background information by first, second, and third level resource providers and vendors relating to their ability to provide resources.

20. The method of managing communications of claim 19 which further comprises the step of evaluating said background information of bidding resource providers and vendors by said project owners and resource providers placing project portions out for bid, as part of evaluating a bid by said bidding resource providers and vendors.

21. The method of managing communications of claim 15 which further comprises the step of providing a list of resource providers with background information indicating capability to perform requirements of a project or a portion of a project, to project owners, or to first, second, or third level resource providers.

22. The method of managing communications of claim 15 which further comprises the step of using said background information of first, second, third level resource providers, and vendors as a template to screen projects, portions of projects, and bids which may be of interest to said first, second, third level resource providers, and vendors.

23. The method of managing communications of claim 22 which further comprises the step of providing multiple templates for first, second, third level resource providers, and vendors for advanced filtering of projects and portions of projects, for providing lists of projects of interest from said system database to system participants.

24. The method of managing communications of claim 23 which further comprises the step of providing multiple user modifiable templates for first, second, third level resource providers, and vendors for advanced filtering of projects and portions of projects, in which one or more of said user modifiable templates remain proprietary to said first, second, third level resource providers, and vendors.

25. The method of managing communications of claim 23 which further comprises the step of providing multiple user modifiable templates to first, second, third level resource providers, and vendors for advanced filtering of system databases, in which said user modifiable templates remain proprietary to said first, second, third level resource providers, and vendors.

26. The method of managing communications of claim 24 which further comprises the step of providing multiple user modifiable templates for first, second, third level resource providers, and vendors for advanced filtering of system databases, and providing a means for system participants to communicate with other system participants who may require goods or services to complete or bid on a project or a portion of project.

27. The method of managing communications of claim 15 which further comprises the step of providing a means of statusing a state of completion of bidding on a project or portion of a project, from first, second, third level resource providers, or vendors.

28. The method of managing communications of claim 13 which further comprises the step of providing bid date information and any modification of bid date.

29. The method of managing communications of claim 27 which further comprises the step of providing a list of qualified first level resource providers, as part of the statusing of said state of completion of a bid.

30. The method of managing communications of claim 27 which further comprises the step of providing a list of known or interested bidders for a portion of a project.

31. The method of managing communications of claim 27 which further comprises the step of providing a notice to bidders of lack of competitive bids for one or more portions of a project.

32. The method of managing communications of claim 31 which further comprises the step of providing a notice to bidders of lack of qualified bids for one or more portions of a project.

33. The method of managing communications of claim 15 which further comprises the step of pre-qualifying resource providers based on supplied background information before said resource providers can bid on projects or as a method of qualifying those bids after submittal.

34. The method of managing communications of claim 1 in which the step of providing a means for a resource provider to select projects of interest further comprises the steps of entering resource capabilities of a resource provider in a resource template which is sent to said resource system database, and integrating said resource capabilities with resource requirements of one or more projects, and yielding a list of projects which fall within said resource capabilities of said resource provider.

35. The method of managing communications of claim 34 in which the step of providing a means for a resource provider to select projects of interest further comprises the step of keeping portions of said resource template confidential from other participants in said network based business system.

36. The step of managing communications of claim 32 which further includes the steps of:
submitting information on the specifications of a project by said project owner in a specifications template;
submitting information on the resource providing capabilities of said first, second, or third level resource provider in a first resource capabilities template, which is sent to said resource system database;
submitting information on the resource providing capabilities of a first, second, or third level resource provider in a second resource capabilities template which is not sent to said resource system database;
submitting information on resource specifications by vendors including price and quality specifications in a vendor product template;
providing a means for comparing said vendor product template information with said first and second resource capabilities template information, and automatically sending said vendor product information to said resource provider; and
providing a means for posting a project by a resource provider for bid by one or more vendors.

37. A method for managing communications between resource providers, vendors, and project owners, in a network based business system, comprising the steps of:
linking one or more project owners to a network;
linking a plurality of first level resource providers to a network;
linking a plurality of second level resource providers to a network;
linking a plurality of third level resource providers to a network;
linking a plurality of vendors to a network;
linking one or more resource system databases with said project owners, resource providers and vendors, on said network;
preparing specifications of one or more projects by an owner of said projects;
posting said specifications on said network;
providing a means for a first level resource provider to select projects of interest;
providing a means for a first level resource provider to view details of a project of interest;
providing a means for said first level resource provider to divide a project into portions and post one or more of said portions for bidding by one or more second level resource providers, as second level projects;
providing a means for one or more second level resource providers to select second level projects of interest posted by said first level resource provider;
providing a means for a second level resource provider to view details of a second level project of interest;
providing a means for a second level resource provider to bid on said second level project of interest;
providing a means for said second level resource provider to divide a project into portions and post one or more of said portions for bidding by one or more third level resource providers, as third level projects;
providing a means for one or more third level resource providers to select third level projects of interest posted by said second level resource provider;
providing a means for a third level resource provider to view details of a third level project of interest;
providing a means for a third level resource provider to bid on said third level project of interest;
providing a means for said first or second or third level resource provider to divide a project into portions and post one or more of said portions for bidding by one or more vendors, as requests for proposals;

providing a means for one or more vendors to select requests for proposals of interest posted by said third level resource provider;

providing a means for a vendor to view details of requests for proposals;

providing a means for a vendor to bid on said requests for proposals;

providing a means for said first or second or third level resource provider to evaluate and select a winning bid from a vendor for the request for proposal;

providing a means for said third level resource provider to bid on said third level project;

providing a means for said second level resource provider to evaluate and select a winning bid from a third level provider on said third level project;

providing a means for said second level resource provider to bid on said second level project;

providing a means for said first level resource provider to evaluate and select a winning bid from a second level provider on said second level project;

providing a means for said first level resource provider to bid on said first level project; and providing a means for said project owner to evaluate and select a winning bid from said first level resource provider.

38. The method of managing communications of claim 37 in which the step of preparing specifications of a project by an owner of said project further includes preparing specifications of a project by an owner and an architect.

39. The method of managing communications of claim 38 in which the step of preparing specifications of a project by an owner and an architect further includes step of preparing specifications of a project by an owner, an architect, and an engineer.

40. The method of managing communications of claim 37 in which the step of posting said specifications on said network further includes posting project details including project requirements and project drawings.

41. The method of managing communications of claim 37 which further comprises the step of dividing the project into discreet portions so that each portion can be viewed and bid separately.

42. The method of managing communications of claim 37 which further comprises the step of entering background information by resource providers relating to their ability to provide resources.

43. The method of managing communications of claim 42 which further comprises the step of evaluating said background information of resource providers by said project owners as part of evaluating a bid by said resource providers.

44. The method of managing communications of claim 37 which further comprises the step of providing quotes from vendors to first level, second level, and third level resource providers in response to requests for bids on resources.

45. The method of managing communications of claim 37 which further comprises the step of entering background information by first, second, and third level resource providers and vendors relating to their ability to provide resources.

46. The method of managing communications of claim 45 which further comprises the step of evaluating said background information of bidding resource providers and vendors by said project owners and resource providers placing project portions out for bid, as part of evaluating a bid by said bidding resource providers and vendors.

47. The step of managing communications of claim 37 which further includes the steps of:

submitting information on the specifications of a project by said project owner in a specifications template;

submitting information on the resource providing capabilities of a first, second, or third level resource provider in a first resource capabilities template, which is sent to said resource system database;

submitting information on the resource providing capabilities of a first, second, or third level resource provider in a second resource capabilities template which is not sent to said resource system database;

submitting information on resource specifications by vendors including price and quality specifications in a vendor product template;

providing a means for comparing said vendor product template information with said first and second resource capabilities template information, and automatically sending said vendor product information to said resource provider; and providing a means for posting a project by a resource provider for bid by one or more vendors.

48. The step of managing communications of claim 37 which further includes the step of providing to said vendors a list of resource providers who are bidding on a project which has specifications which match information in a vendor product template.

49. The step of managing communications of claim 37 which further includes the step of providing to said resource providers a list of projects which have specifications which match information in said resource provider's resource capabilities template.

50. The step of managing communications of claim 49 which further includes the step of providing said project owners and resource providers with alternative routes of communication for the protection of or secure and limited transfer of proprietary information necessary for the forming of partnerships, preparation of bids, and submittal of bids.

* * * * *